Feb. 2, 1960 P. B. SPRANGER 2,923,890

SAW-TOOTH WAVE GENERATOR

Filed Jan. 29, 1958

INVENTOR.
P. B. SPRANGER
BY [signature]
ATTORNEY

United States Patent Office 2,923,890

Patented Feb. 2, 1960

2,923,890

SAW-TOOTH WAVE GENERATOR

Paul B. Spranger, Sherman Oaks, Calif., assignor to Bendix Aviation Corporation, North Hollywood, Calif., a corporation of Delaware Application January 29, 1958, Serial No. 711,852

2 Claims. (Cl. 331—131)

This invention relates broadly to saw-tooth wave generators.

More specifically, the invention is an improvement or further development in known saw-tooth wave generators utilizing what is known as Miller integrator circuits employing a feedback capacitor between the input and output circuits. In such circuits, the saw-tooth output voltage rises and falls with time over a range determined by the operating limits of the amplifier; i.e., the cut-off and saturation potentials. Within the main portion of the range, the output voltage varies substantially linearly, but at the ends of the range, irregularities occur which can be objectionable in some applications.

An object of the invention is to provide a simple, free-running generator of the Miller integrator type producing a linear saw-tooth wave without irregularities.

Another object is to provide a generator of the type described which can be immediately converted from a saw-tooth wave generator to a D.C. amplifier of an external control potential applied thereto.

Other objects and features of the invention will become apparent from the description to follow.

Broadly, the present invention resides in the addition to a Miller integrator sweep circuit generator of a simple control circuit for automatically terminating each leg of the saw-tooth wave within the linear portion thereof, and thereby eliminating the irregularities that would occur if each leg progressed to the limit determined by the amplifier cut-off or saturation point. In its simplest and preferred form, the control circuit comprises a gas diode connected in shunt to the feedback capacitor. The diode ignites at a predetermined potential, and discharges the capacitor to terminate each upward swing of the output voltage and start the downward swing, and extinguishes at a lower voltage to start the next upward swing. Provision is also made for increasing the voltage range of the output wave relative to the voltage range of the gas tube, for varying the repetition rate, and causing the circuit to function as a D.C. amplifier in response to an external control potential.

A full understanding of the invention may be had from the following detailed description, with reference to the drawing, in which.

Figure 1:
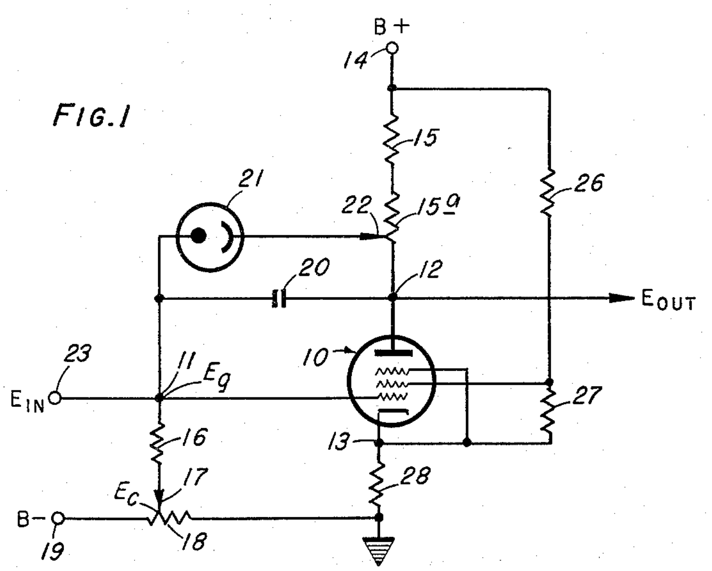
Fig. 1 is a schematic diagram of a circuit incorporating the invention.

The circuit of Fig. 1 comprises, as essential elements: an amplifying device 10 having an input terminal 11, an output terminal 12, and a common terminal 13; a source of energizing potential 14 connected to the output terminal 12 by a coupling impedance comprising two resistors 15 and 15*a* in series; an input resistor 16 connecting the input terminal 11 to a tap 17 on a voltage-dividing resistor 18 which is connected between a source of negative biasing potential 19 and ground; a feedback capacitor 20 connected between the amplier input and output terminals 11 and 12, respectively; and a potential-responsive switch device 21 connected between the amplifier input terminal 11 and a tap 22 on the resistor 15*a*. A control terminal 23 may be connected to the amplifier input terminal 11.

The amplifying device 10 is shown as a pentode having the usual cathode connected to the common terminal 13, control grid connected to the input terminal 11, a screen grid energized from the source 14 through voltage-dividing resistors 26 and 27, a suppressor grid connected to the common terminal 13, and a plate connected to the output terminal 12. The common terminal 13 may be connected to ground through the usual cathode-biasing resistor 28. A triode may be used instead of a pentode, but the higher gain of a pentode is often desirable because the linearity of the circuit is a direct function of the amplifier gain.

As shown, the potential-responsive switch means 21 consists of a cold electrode gas diode which has a very high resistance below an igniting potential, ionizes at the igniting potential to have a relatively low resistance, and extinguishes at a potential below the igniting temperature, to recover its high resistance.

Figure 2:
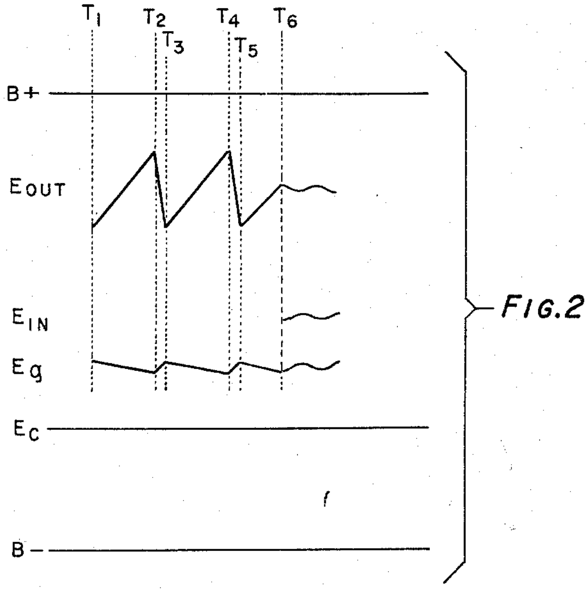
Fig. 2 is a series of graphs illustrating the operation of the system of Fig. 1.

In the absence of an external control potential applied to the terminal 23, the circuit of Fig. 1 operates as a free-running oscillator to produce at the output terminal 12, as shown in Fig. 2, a saw-tooth wave $E_{out}$, and to produce at the input terminal 11 a saw-tooth wave $E_g$.

Tracing the operation of the circuit in detail, at time $T_1$ (Fig. 2) the potential $E_g$ on the input terminal 11 is more positive than the potential $E_c$ at the tap 17, and sufficiently positive to render the amplifier 10 relatively conductive so that the output potential $E_{out}$ on terminal 12 is relatively low, because of the potential drop in the resistors 15 and 15*a*. $E_g$ tends to go negative because current is flowing through the input resistor 16 to charge the capacitor 20, and if $E_{out}$ remained constant, capacitor 20 would charge exponentially at a diminishing rate, causing $E_g$ to decrease (move in negative direction) exponentially. However, because of the amplifying effect of the amplifier 10, any decrease in $E_g$ tends to produce a larger increase in $E_{out}$, in turn tending to increase the charging current to the capacitor 20 and thereby opposing the decrease in $E_g$. In other words, there is negative feedback from the output terminal 12 of the amplifier through the capacitor 20 to the input of the amplifier, so that the charging current through the resistor 16 and the resultant potential $E_g$ decrease more slowly and much more linearly than they otherwise would. The variations in $E_g$ produce corresponding amplified variations in $E_{out}$ within the operating limits of the amplifier 10. Over a portion of the operating range of the amplifier, both $E_g$ and $E_{out}$ vary substantially linearly in opposite directions, and the circuit is constrained to operate within this portion of the total range by the voltage-responsive switching device 21.

This device 21, as shown, is a tube of well-known type, comprising two cold electrodes in a gas atmosphere, which is substantially nonconducting below an igniting potential, becomes conducting at the igniting potential, and remains conductive until the potential drops below an extinguishing potential which is lower than the igniting potential. The igniting and extinguishing potentials are fixed for any given tube, but tubes are available having ignition and extinguishing potentials within the linear portion of the range of potential variation between the input and the output terminals of the amplifier 10.

Thus, referring to Fig. 2, at time T2 the potential $E_{out}$ has risen, and the potential $E_g$ has dropped, to such an extent that the difference therebetween is the igniting potential of the tube 21, whereupon the resistance of the tube drops to a low value, and the capacitor 20 rapidly discharges therethrough until the potential thereacross reaches the extinguishing potential and the tube again becomes nonconductive, whereupon the cycle repeats.

The reversals of the potentials $E_g$ and $E_{out}$ in Fig. 2 are sharp and without ambiguities, since they are produced entirely by switching device 21 acting within the normal operating range of the amplifier 10 within which range it is not driven to saturation or cut-off.

By adjusting the tap 22 on resistor *15a* upwardly from the lower end thereof, the ranges of the potentials $E_g$ and $E_{out}$ can be increased relative to the conductive range of the switch 21, since only a fraction of the total potential variation occurring at the amplifier output 12 is then applied to the tap 22. This increases the utility of the circuit, since available switching devices may not have the range desired in the output potential $E_{out}$. Upward adjustment of the tap 22 also increases the resistance in the discharge circuit from the capacitor 20 through the switching device 21, decreasing the slopes of the curves $E_g$ and $E_{out}$ (Fig. 2) during condenser discharge, and increasing the time lapse between times T2 and T3. However, this increase is small compared to the length of the charging period (the upwardly extending legs on the curves) and therefore does not materially alter the repetition rate of the circuit.

By adjusting tap 17 on resistor 18, the biasing potential can be varied to vary the total potential impressed on the capacitor 20 and thereby vary the charging time of the capacitor. This changes the slope of the upward swings of the output potential $E_{out}$ and thereby changes the repetition frequency.

Control of the amplifier 10 can be taken away from the circuit consisting of resistor 16 and capacitor 20 by the application of a control potential $E_{in}$ to the input terminal 23. The circuit then functions as a D.C. amplifier (for potentials below which the tube 21 ignites), as shown in Fig. 2, beginning at time T6.

Although for the purpose of explaining the invention a particular embodiment thereof has been shown and described, obvious modifications will occur to a person skilled in the art, and I do not desire to be limited to the exact details shown and described.

I claim:

1. A saw-tooth wave oscillator comprising: an amplifying device having input and output terminals and a common terminal, and having increasing conductivity between said common and output terminals with increasing potential on its input terminal; means including a source of energizing potential and a coupling impedance connected in series relation between said common terminal and said output terminal for applying to said output terminal a potential varying inversely with the conductivity of said amplifying device, said impedance having a tap thereon; means including an input resistor for applying through said input resistor to said input terminal a biasing potential of lower value than the potential of said output terminal; a capacitor and means connecting it between said input and output terminals whereby, following application and removal of a potential higher than said biasing potential to said input terminal, the potential of said input terminal decreases as said capacitor charges through said input resistor; potential-responsive switch means and means connecting it between said input terminal and said tap on said impedance whereby potential variations across said switch means are proportional to but less than the potential variations between said input and output terminals, said switch means being self-closing in response to potential thereacross exceeding a first value and self-opening in response to potential thereacross below a second value lower than said first value, and said first and second values lying well within the limits of variations of the differential potential between said input terminal and said tap over the operating range of said amplifying device, whereby said oscillator is free-running.

2. Apparatus according to claim 1 in which said means for applying a biasing potential to said input terminal includes means for selectively varying said biasing potential to vary the repetition rate of said oscillator.

References Cited in the file of this patent

UNITED STATES PATENTS

| | | |
|---|---|---|
| 2,494,865 | Fleming-Williams et al. | Jan. 17, 1950 |
| 2,662,981 | Segerstrom | Dec. 15, 1953 |
| 2,692,334 | Blumlein | Oct. 19, 1954 |
| 2,802,107 | Arnold | Aug. 6, 1957 |